United States Patent Office 2,789,270
Patented Apr. 16, 1957

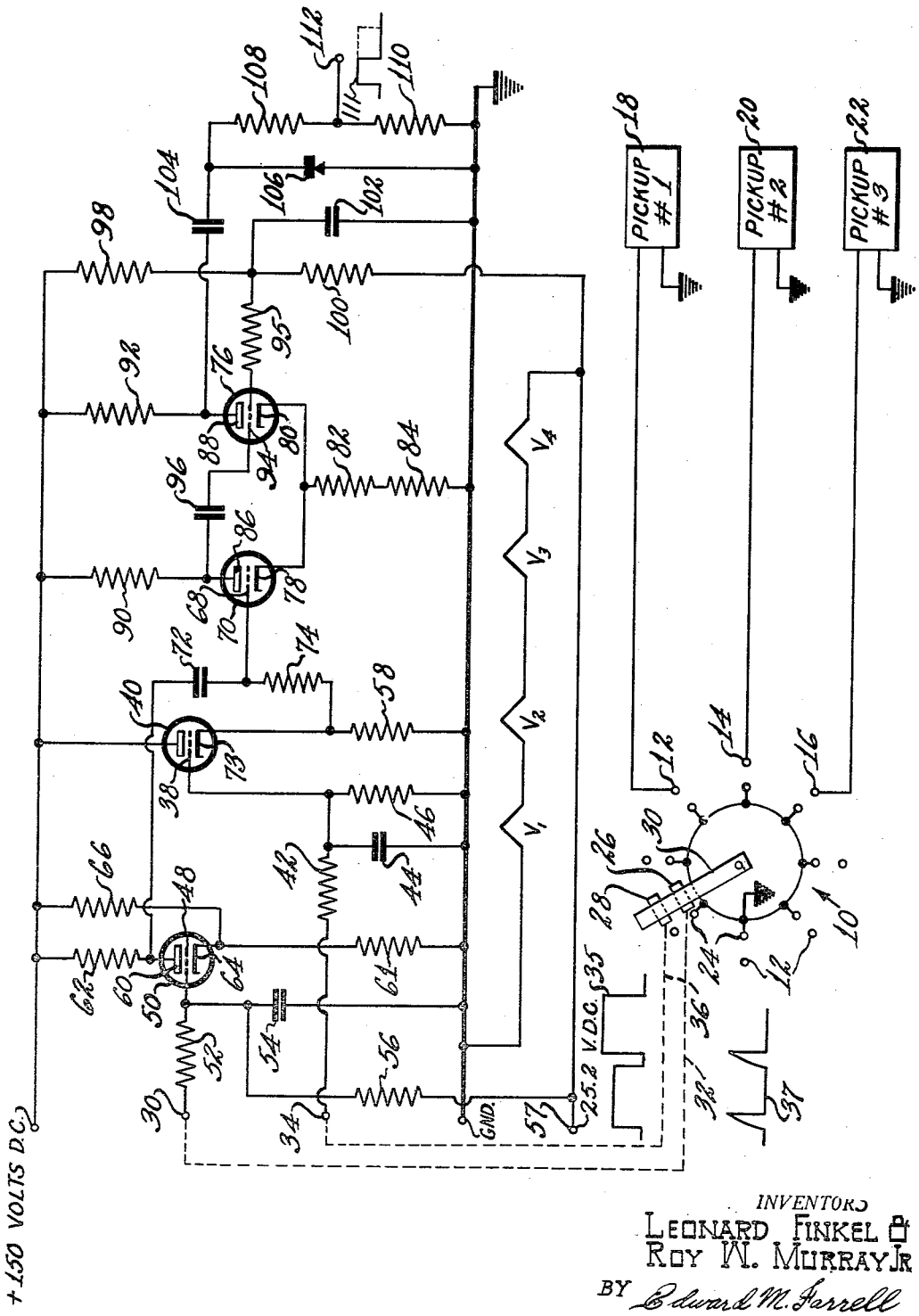

2,789,270

MODULATION CONVERTER

Leonard Finkel, Delaware Township, Camden County, N. J., and Roy W. Murray, Jr., Reseda, Calif., assignors to Tele-Dynamics Inc., a corporation of Pennsylvania Application June 17, 1955, Serial No. 516,174

8 Claims. (Cl. 332—1)

This invention relates to modulator circuits, and more particularly to means for minimizing contact noises from mechanical switching devices associated with such circuits.

In most types of telemetering systems, it is often desirable to measure or record numerous variable quantities. For example, in a telemetering system associated with a guided missile, pilotless aircraft or projectile, recordation or measurement of acceleration, temperature, pressure, current or other variable functions is often necessary to obtain flight information under various environmental conditions. Such a telemetering system generally includes pickups by which each variable quantity to be measured is converted into a corresponding electrical signal, such as a voltage of variable amplitude. The electrical signal may then be used to modulate a subcarrier oscillator within the telemetering system. The output signals from a plurality of such sub-carrier oscillators, generally eighteen in number, may then be used to frequency or phase modulate a carrier signal of an associated transmitter. In such systems, a receiving station may be situated at a remote point. The transmitted carrier signal from the guided missile or other airborne apparatus is generally transmitted to the receiving station. Upon reception of the transmitted carrier signal, suitable demodulation means at the receiving station restore the electrical signals which were originated at the telemetering pickups. Since these electrical signals are functions of the variable quantities measured, indications of the character of such measured functions are readily attainable.

In a standard telemetering system where a limited frequency band and a limited number of sub-carrier oscillators are employed, it is often necessary that a time division multiplexing arrangement be employed if quantities greater than the number of sub-carrier oscillators are to be measured. In such a multiplexing system, the sub-carrier oscillators may carry a number of measurements sampled in sequence by a switching device. Such multiplexing systems are well known and used extensively where it is desirable to transmit a maximum amount of information within a limited frequency band. Mechanical switching devices or commutators are used extensively in such multiplexing systems, since they are relatively simple and offer a maximum amount of reliability. Mechanical switching devices, or commutators, utilized in many multiplexing systems often comprise a brush member successively engaging a plurality of contacts which are connected to the electrical circuits or pickups to be sampled. The brush member may be connected to an amplifier or other utilization circuit by means of a slip ring and contact. Means for moving the brush member to periodically engage each of the contacts are generally provided, whereby a sample of the information voltage from an electrical circuit or pickup may be applied to the utilization circuit.

In high speed operation of commutators, a brush member, generally resiliently mounted to engage the contacts, often bounces from the contact or otherwise makes non-constant or erratic circuit closure with the contact thereby causing a discontinuity to exist between the utilization circuit and the associated pickup. Such a bouncing or discontinuity often introduces undesirable noise in the utilization circuit.

In systems utilizing pulse width modulation, such as in telemetering and other electrical systems, the original signal information from a pickup may vary in amplitude in accordance with a variable function. In so-called FM/FM telemetering systems, the information signal voltage which may, for example, vary between 0 and 5 volts is applied to frequency modulate a low frequency oscillator. The output voltage from the oscillator, in turn, frequency modulates a transmitter oscillator. For numerous reasons, it may be desirable to frequency modulate the low frequency oscillator by a signal in which the amplitude remains relatively constant and the width varies in accordance with the strength of the information signal. In this case, the original variable amplitude pulses from the pickups are converted into corresponding pulses of variable width. With the additional circuitry involved in converting the nature of the information signals from pulses of variable amplitude to pulses of variable width it becomes increasingly important to minimize the amount of noise which is introduced into the system prior to the low frequency oscillator.

It is an object of this invention to provide a system in which contact noise from a switching device is minimized.

It is a further object of this invention to provide an improved pulse width modulator circuit.

It is still a further object of this invention to provide an improved pulse width modulator circuit which is relatively simple and inexpensive and which may be used to convert amplitude modulated signals to corresponding pulse width modulated signals.

In accordance with the present invention, a mechanical switching device is used to connect various electrical circuits or pickups to a pulse width modulator circuit. Connections between the modulator circuit and electrical circuits are attained through brush members periodically electrically engaging a plurality of contacts. At the input to the modulator circuit, a filter network is provided to maintain the input voltage at a relatively fixed level when the brush member is engaging a single contact, despite bouncing or discontinuity between the associated brush member and the contact. A mixing circuit is provided for mixing the output voltages from a source of synchronization signals and the information signals from the electrical circuits or pickups. The mixed output voltage may then be applied to a form of multivibrator circuit. The multivibrator circuit provides an output voltage, or square wave pulses, the width of which varies in accordance with the amplitude of the information signals from the electrical circuits. The variable width pulses may then be used to frequency modulate a low frequency oscillator or may be applied to some other appropriate circuit.

Other objects and advantages of the present invention will be apparent and suggest themselves to those skilled in the art to which the invention is related, from a reading of the following specification in connection with the accompanying drawing.

The single figure of the drawing is a schematic diagram of a pulse width modulator and an associated noise filter circuit, in accordance with the present invention.

Referring to the drawing, there is shown schematically a pulse width modulator. Synchronization signals and information signals are first applied from a commutator to a noise filter circuit. A combined output voltage, resulting from the synchronization and information signals is used to trigger a multivibrator circuit. The voltage output from the multivibrator circuit is then applied to a clamping circuit and a voltage divider network. The voltage from a portion of the voltage divider network may then be applied to a low frequency oscillator or other utilization circuit.

A commutator or switching device 10 includes a plurality of outside electrical contacts which includes contacts 12, 14 and 16 connected to a source of information signals represented by blocks 18, 20 and 22, designated as pickups numbers 1, 2 and 3, respectively. The number of pickups may be increased with the outputs therefrom connected to other outside electrical contacts of the commutator.

Inside electrical contacts 24 are electrically connected together and returned to a point of reference potential, designated as ground.

Electrically conductive brush members 26 and 28 are mounted on an insulated arm 30. The arm 30 is adapted to be rotated by a motor or other driving means (not shown) whereby the brushes 26 and 28 successively engage each of the inside and outside contacts, respectively, for each revolution of the arm 30.

The brush member 26 is electrically connected to an input terminal 30 through a conductor, designated by a dotted line 36. The conductors 32 and 36 may comprise slip rings associated with the commutator 10.

It is seen that a voltage applied between the input terminal 34 and ground is applied to a control grid 38 of an electron discharge device 40 through a resistor 42. The device 40 is in the form of a cathode follower to provide a high impedance input circuit for the applied information voltage. A capacitor 44 and a resistor 46 are included in the grid input circuit of the device 40 and comprise part of a filter network, along with the resistor 42, as will be described.

The input terminal 30, adapted to receive a synchronization signal from the brush member 26 is connected to a grid 48 of an electron discharge device 50 through a resistor 52. A capacitor 54 is connected in the input circuit of the device 50 to provide part of a noise filter network, as will be described. A source of positive potential may be connected to the terminal 57. This potential is applied to the control grid 50 through a resistor 56. The source of potential, which may be 25.2 volts D. C., may also be utilized to provide filament voltages for the electron discharge devices utilized in the system the filaments of which are indicated as V1, V2, V3 and V4.

Resistors 58 and 61 provide means for biasing the devices 40 and 50 respectively. The anode 60 of the device 50 is connected to a source of regulated voltage, designated +150 volts D. C. through a load resistor 62. The cathode 64 is connected to the 150+ voltage source through a resistor 66 which provides part of a voltage divider, along with the resistor 61.

The anode 60 of the device 50 is connected to the grid 68 of the electron device 70 through a capacitor 72. The cathode 73 of the device 40 is also connected to the grid 68 through a resistor 74. The capacitor 72 and the resistor 74 may be considered as a mixer circuit for combining the voltage outputs from the devices 40 and 50.

The device 70 and an electron discharge device 76 comprise a form of one-shot multivibrator circuit. Cathodes 78 and 80 are directly coupled together with a pair of resistors 82 and 84 connected between the cathodes 78, 80 and ground. Two resistors of different temperature coefficients are provided for temperature compensation in the multivibrator circuit. Anodes 86 and 88 are connected to the source of 150 volts through load resistors 90 and 92, respectively. The anode 86 is connected to the control grid 94 of the device 76 through a capacitor 96.

The grid 94 is connected through a resistor 95 to an intermediate point of a form of voltage divider, which includes a resistor 98 connected to the 150 D. C. voltage source and a resistor 100 connected to the 25.2 D. C. voltage source. A capacitor 102 is connected between the intermediate or junction point of resistors 98, 100 and ground. The arrangement shown provides a form of heater voltage compensation since any fluctuations in the heater voltage will be reflected at the grid 94 of the device 76.

The output voltage from the anode 88 is connected to a clamping circuit comprising a capacitor 104, a diode rectifier 106, and resistors 108 and 110. The voltage developed across the diode rectifier 106 is applied across a voltage divider comprising resistors 108 and 110. The output voltage from the resistor 110 may be applied to a sub-carrier oscillator or other utilization circuit (not shown) through an output terminal 112 and ground.

In considering the operation of the pulse width modulator shown, first consider the information signals originating at the pickups 18, 20 and 22. These signals are applied to the outer contacts 12, 14 and 16, respectively, of the commutator 10. When the brush member 28, moving in the direction indicated by the arrow, sequentially engages the respective contacts, the electrical signals from the commutator, represented by a wave form 35 are applied through the conductor 36 to the input terminal 34. The input terminal 34 is connected to the control grid 38 of the device 40 through the resistor 42. The capacitor 44 is connected between the grid 38 and ground. The resistor 46 constitutes the grid load resistor for the device 40. When the signal information voltage, which may vary between zero to five volts, for example, is applied to the grid 38, the capacitor 44 is charged to a certain level. If the brush member 28 bounces or is disconnected from one of the contacts, while associated with such a contact, a high impedance is provided in the discharge path of the capacitor 44. A path of infinite impedance in series with the resistor 42 is created due to the discontinuity or bouncing of the brush member from the contact. The discharge path through the resistor 46 offers a path of high impedance due to the relatively high value of the resistor 46. The capacitor 44, therefore, tends to maintain its original charge. The voltage at the grid 38, therefore, remains at substantially the same voltage level despite the bouncing or discontinuity between the brush member 28 and its associated contact during operation. Contact noise and other spurious noises within the system is reduced considerably with such a filter arrangement, as illustrated. It is noted that after the brush member leaves one of the contacts and is moved towards the next contact, that the voltage at the grid 38 tends to maintain the voltage level of the information signal of the first of said contacts. However, due to the synchronization pulses utilized in the system and the operation of the subsequent multivibrator circuit, operation of the system will not be affected by such a voltage. When the brush member 28 contacts the next contact, a low impedance path through the commutator is formed, as the voltages at 38 charge to the information voltage in short time. The information signal voltage applied to the grid 38 is amplified by the device 40, which is normally conducting.

The inner contacts of the commutator 10 provide means for producing synchronization pulses when the brush member 26 successively engages the inner contacts 24. It is seen that all the inner contacts 24 are electrically connected together and returned to ground.

The device 50 is normally conducting with its grid 48 connected to the D. C. source of 25.2 volts. The cathode 64 is maintained at a positive potential, being connected to the 150 volt D. C. source through the resistor 66. The resistor 61, connected between the cathode 64 and ground forms part of a voltage divider along with the resistor 66.

It is seen that the capacitor 54 will attain a certain charge due to the voltage from the 25.2 D. C. voltage source. Since the control grid 48 draws current, the voltage drop across the resistor 56 will cause the voltage at the capacitor 54 to be somewhat less than 25.2 volts. When the brush 24 electrically engages one of the inner contacts 24 of the commutator 10, the grid 48 is effectively grounded through the resistor 52 and the brush member 24. The positive potential at the grid 48 is removed with the capacitor 54 discharging through the resistor 52 which may be of a relatively low value thereby driving the device 50 beyond cutoff due to the positive potential at the cathode 64. The voltage at the anode 60 rises when the device 50 is cut off. Due to the shorting of the brush member 24 to ground and the accompanying discharge of the capacitor 54, the commutator 10 may be said to provide synchronization pulses, such as shown by waveform 37.

In the present circuit, the resistor 56 is of a relatively large value and higher than the resistor 52. It is seen that the arrangement shown provides an effective means for minimizing contact noise resulting from a bouncing or discontinuity of the brush 26 from one of the inner contacts 24. If a bouncing of the brush member from an associated contact takes place, the effective short circuit across the capacitor 54 is removed. The capacitor 54 will, therefore, start to charge to the voltage value of the 25.2 voltage source. However, since the resistor 56 is of a relatively large value, the capacitor 54 charges slowly and ordinarily cannot charge to a point which is sufficient to cause conduction in the device 50. Thus, it is seen, any noise resulting from a bouncing of the brush member 24 or other contact noise is effectively minimized through the use of the noise filter network associated with a commutator, as shown. When the grid 48 is shorted to ground through the commutator 10, the device 50 is cut off causing positive synchronization pulses at the anode 60.

The capacitor 72 and the resistor 74, connected to the anode 60 and the cathode 73, respectively, comprise a form of mixing circuit. The information signal from the cathode 73 is mixed with the synchronization information from the anode 60, with the combined output being applied to the grid 68 of the device 70. The capacitor 72 and the resistors 74 and 58 form a differentiating network for the approximately trapezoidal synchronization signals from the anode 60. Due to the time constants of the differentiating network, a relatively sharp positive, and a small, broad negative pulse result from each of the synchronization pulses. The positive pulse is applied to the control grid 68 and is used to trigger a form of multivibrator circuit.

It is seen that the synchronization signals, as represented by the waveform 37 is narrower than the information signal pulses represented by the waveform 35. The positive pulses to trigger the multivibrator are derived from the leading edge of the waveform 37. Thus, the beginning of the information pulses, which may be noisy, does not affect the operation of the multivibrator, since the strength of the information pulses is not of sufficient amplitude to trigger the multivibrator.

The information signal voltage from the cathode 73 is also applied to the grid 68. The amplitude of this voltage affects the operation of the multivibrator circuit whereby the width of the output voltage from the multivibrator is a function of the amplitude of the input information signal voltage, as will be seen.

The multivibrator circuit comprises the pair of electron discharge devices 70 and 76. The device 70 is normally cut-off due to the voltage drop across the resistors 82 and 84. The device 76 is normally conducting with the grid 94 being connected to the sources of positive potential.

The positive pulses from the differentiating network resulting from the synchronization pulses are sufficient in amplitude to raise the grid 68 of the device 86 above its cut-off voltage. The device 70, therefore, starts to conduct causing the voltage at its anode 86 to decrease due to the voltage drop across the resistor 90. This decrease in voltage in effect passes through the capacitor 96 as the voltage across a capacitor cannot be changed instantaneously, and is applied to the grid 94 of the device 76. The decreased or negative voltage at the grid 94 causes the current in the device 76 to decrease. The voltage drop across the resistors 82 and 84 decreases permitting more current to flow in the device 70. The voltage at the anode 86 is still further decreased. The voltage at the grid 94 goes still more negative. The action described is repeated until the device 76 is cut off, and the device 70 is conducting. The action is practically instantaneous.

The circuit remains with the device 70 conducting and the device 76 cut off while the capacitor 96 discharges sufficiently towards the lowered value of the anode voltage of the device 70 to allow the grid 94 of the device 76 to rise from its lowered value to cut-off voltage. At this time, the device 76 starts to conduct. The current through the resistors 82 and 84 increases thereby increasing the voltage drop thereacross to reduce the current flow in the device 70. The decreased current in the device 70 causes the voltage at the anode 86 to increase. This increase is coupled to the grid 94 further increasing the current in the device 76. The action is repeated until the device 70 is again cut off and the device 76 is conducting heavily. Again, this action is practically instantaneous.

Due to the instantaneous actions, the voltage output from the multivibrator at the anode 88 is in the form of a square wave. It has been indicated that the voltage across the capacitor 96 must discharge to a certain point before the device 76 will conduct. The point to which the capacitor 96 must discharge is determined by the voltage drop across the resistors 82 and 84. The width of the voltage pulse at the anode 88 is dependent upon the time it takes the capacitor 96 to discharge to the point to cause conduction in the device 76. Since this time depends upon the cut off voltage developed across the resistors 82 and 84 and the magnitude of the pulse at anode 86, both of which are in turn dependent upon the amplitude of the information signals, it is seen that the original information signals of varying amplitude are translated into corresponding electrical signals of variable pulse width. The greater the voltages developed across the resistors 82, 84 and 90, the longer will be the discharge time of the capacitor 96. Consequently, the pulses at the anode 88 will be relatively wide for information signals of high amplitude and relatively narrow for information signals of low amplitude.

In pulse width modulation systems it is generally desirable to have pulses of variable width and relatively constant amplitude and level corresponding to the standard 0–5 volt information signal. A clamping circuit, including the capacitor 104, the diode 106, and resistors 108, 110 is used to maintain the output voltage from the anode 88 at a relatively constant level.

In the circuit shown the capacitor 104 charges through the resistors 108 and 110 to the voltage of the anode 88. When the voltage at the anode 88 rises instantaneously, the voltage rise is applied across the resistors 108 and 110, since the charge on the capacitor 104 cannot change instantaneously. When the voltage at the anode 88 drops or returns to its normal value, the voltage across the resistors 108 and 110 also drops. The diode acts as a short circuit to discharge the capacitor 104 when it acquires a charge greater than the normal voltage at the anode 88. Such clamping circuits are known to those skilled in the art.

The voltage divider comprising the resistor 108 and 110 is utilized to provide means for providing a relatively low output voltage and impedance between the terminal 112 and ground. The rise in the voltage level at the anode 88 during the operation is generally too high to apply directly to sub-carrier oscillators or other utilization circuits, thereby necessitating some form of voltage divider, such as that shown. A voltage output of relatively constant amplitude and variable width from the terminal 112 is represented by a waveform 111.

It is thus seen that the present invention has provided a novel means for minimizing contact noises originating from a mechanical switching device. In addition, a relatively simple circuit is provided whereby signals of varying amplitude may be converted into corresponding signals of variable width.

It is noted that many present telemetering systems utilizing variable amplitude pulses for modulation purposes may be readily converted to a variable pulse width modulation system.

What is claimed is:

1. In combination with a modulator circuit for converting amplitude modulated signals into corresponding pulse width modulated signals, a noise reduction system comprising a plurality of pickups, a cathode follower to provide a relatively high input impedance, a mechanical switching device having electrical contacts and brush members, said brush members being adapted to periodically engage said electrical contacts during the operation of said mechanical switching device, means for electrically connecting said pickups to said cathode follower through said mechanical switching device, whereby sampling pulses from said pickups are applied to said cathode follower, filter means associated with said cathode follower for maintaining said sampling pulses at the input circuit of said cathode follower at a relatively fixed level when one of said brush members is associated with one of said electrical contacts during the operation of said switching device, an amplifier device normally conducting, means including said mechanical switching device for supplying synchronization pulses to cut off said amplifier device, and a second filter means associated with said amplifier device for maintaining said synchronization pulses at a relatively fixed maximum level when said mechanical switching device is supplying said synchronization pulses.

2. The invention as set forth in claim 1 wherein a mixing circuit is provided for mixing the voltage outputs from said cathode follower and said amplifier device.

3. The invention as set forth in claim 2 wherein the voltage output from said mixing circuit is utilized to control the operation of a multivibrator circuit.

4. A modulator circuit for converting amplitude modulated information signals into corresponding pulse width modulated signals comprising a plurality of pickups providing said amplitude modulated information signals, means providing synchronization signals, means for differentiating said synchronization signals, means for mixing said information signals and the differentiated synchronization signals, a one shot multivibrator circuit having a relatively square wave output voltage, means for applying the mixed information and differentiated synchronization signals to said multivibrator circuit, said differentiated synchronization signals providing means for triggering said multivibrator circuit, and said information signals determining the width of said square wave output voltage from said multivibrator circuit.

5. In a time division multiplexing system, the combination comprising a modulator circuit for converting amplitude modulated information signals into corresponding pulse width modulated signals comprising a plurality of pickups providing said amplitude modulated information signals, a commutator for connecting said pickups to said modulator circuit, means including said commutator for providing synchronization signals, means for differentiating said synchronization signals, means for mixing said information signals and the differentiated synchronization signals, a multivibrator circuit having a relatively square wave output voltage of constant amplitude, means for applying the mixed information and differentiated synchronization signals to said multivibrator circuit, said differentiated synchronization signals providing means for triggering said multivibrator circuit, and said information signals determining the width of said square wave output voltage from said multivibrator circuit.

6. The invention as set forth in claim 5 wherein the output voltage from said multivibrator circuit is applied to a clamping circuit.

7. The invention as set forth in claim 6 wherein said clamping circuit includes a voltage divider network.

8. The invention as set forth in claim 7 wherein said multivibrator circuit includes means for compensation for changes in filament voltage.

References Cited in the file of this patent

UNITED STATES PATENTS

| | | |
|---|---|---|
| 2,020,950 | Lee | Nov. 12, 1935 |
| 2,432,204 | Miller | Dec. 9, 1947 |